United States Patent
Arinaga et al.

(10) Patent No.: US 7,709,972 B2
(45) Date of Patent: May 4, 2010

(54) WIND TURBINE SYSTEM FOR SATISFYING LOW-VOLTAGE RIDE THROUGH REQUIREMENT

(75) Inventors: Shinji Arinaga, Nagasaki (JP); Takatoshi Matsushita, Nagasaki (JP); Tsuyoshi Wakasa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 172 days.

(21) Appl. No.: 11/896,152

(22) Filed: Aug. 30, 2007

(65) Prior Publication Data
US 2009/0058086 A1 Mar. 5, 2009

(51) Int. Cl.
*H02P 9/04* (2006.01)
*F03D 9/00* (2006.01)
(52) U.S. Cl. .......................... 290/55; 290/44
(58) Field of Classification Search ............ 290/44, 290/55; 416/7, 132 B; 60/398
See application file for complete search history.

(56) References Cited

U.S. PATENT DOCUMENTS

| | | | | |
|---|---|---|---|---|
| 4,423,333 A | * | 12/1983 | Rossman | 290/44 |
| 5,907,192 A | * | 5/1999 | Lyons et al. | 290/44 |
| 2007/0267873 A1 | * | 11/2007 | Teichmann | 290/44 |
| 2008/0054641 A1 | * | 3/2008 | Voss | 290/44 |
| 2008/0129050 A1 | * | 6/2008 | Guey et al. | 290/43 |
| 2009/0066089 A1 | * | 3/2009 | Arinaga et al. | 290/55 |

FOREIGN PATENT DOCUMENTS

| JP | 2006246553 A | * | 9/2006 |
|---|---|---|---|
| JP | 2007231778 A | * | 9/2007 |
| JP | 2007239599 A | * | 9/2007 |

\* cited by examiner

*Primary Examiner*—Julio Gonzalez
(74) *Attorney, Agent, or Firm*—Kanesaka Berner and Partners LLP.

(57) ABSTRACT

A wind turbine system is provided with a wind turbine rotor, a pitch control mechanism, and an emergency power supply mechanism. The wind turbine rotor includes a blade having a variable pitch angle. The pitch control mechanism drives the blade to control the pitch angle. The emergency power supply mechanism generates electric power from rotation of the wind turbine rotor and feeds the electric power to the pitch control mechanism, in response to occurrence of an accidental drop of a system voltage of a power grid.

10 Claims, 6 Drawing Sheets

WIND TURBINE SYSTEM FOR SATISFYING LOW-VOLTAGE RIDE THROUGH REQUIREMENT

BACKGROUND OF THE INVENTION

1. Field of the Invention

The present invention relates to a wind turbine system, particularly to a technique for dealing with accidental drop of the system voltage in a power system.

2. Description of the Related Art

Recent wind turbine systems are required to feed electric power to the power grid with improved stability and higher reliability. One important requirement is to satisfy low-voltage ride through (LVRT) requirement which requires that a wind turbine power system must remain connected to the power grid when the system voltage suddenly drops resulting from an accident in the power grid. Most conventional wind turbine systems are designed so that controllers and other auxiliaries operate on electric power fed from the power grid; however, such-structured wind turbine systems can not continue to operate when the system voltage accidentally drops. One important issue is that the system voltage drop may excessively reduce the load of the generator, resulting in an excessive increase in the revolution speed of the turbine rotor. The excessive increase in the revolution speed is undesirable in itself in terms of safety. Additionally, the excessive increase in the revolution speed may undesirably result in that an excessively large voltage is applied to a voltage converter connected with the generator. In order to avoid these, the wind turbine system must be stopped and disconnected from the power grid.

One approach for satisfying the LVRT requirement is to use an uninterruptible power supply (UPS), as disclosed in U.S. Pat. No. 6,921,985. In the technique disclosed in this patent, an uninterruptible power supply starts to feed electric power to necessary instruments (such as, a power converter, a turbine controller, a blade pitch control system, and a crowbar circuit), when the system voltage drop is detected; the uninterruptible power supply does not feed electric power to unnecessary instruments. Feeding electric power to the blade pitch control system allows pitch angle control of the wind turbine blades, while feeding electric power to the crowbar circuits allows protection of the power converter.

One issue of using a UPS is that the UPS requires lots of maintenance. Batteries within an UPS suffer from deterioration caused by aging, and therefore the batteries needed to be exchanged in order to maintain the performance of the UPS. This undesirably increases the labor and cost needed for the maintenance of the wind turbine system.

U.S. Pat. No. 7,095,129 also depicts a fact that there is no power available for the load control system that provides asymmetric load control for a wind turbine. This document discloses a wind turbine having a plurality of generators, of which a first generator is configured to provide power to an electric grid and a second generator is configured to provide power to the wind turbine during times of grid loss. The disclosed wind turbine is configured to utilize power provided by the second generator to reduce loads on the wind turbine during times of grid loss.

Japanese Laid-Open Patent Application No. 2004-140971 discloses a mechanism for contact-free feeding of electric power to instruments provided on a rotating body rotating with a turbine rotor. The disclosed mechanism provides contact-free feeding of electric power by using a rotary transformer or an induction machine, reducing the necessity of maintenance. This patent application, however, does not disclose a technique for dealing with an accidental system voltage drop.

There is a need for a technique for providing a wind turbine system with the LVRT performance by using a mechanism that requires reduced maintenance.

SUMMARY OF THE INVENTION

Therefore, an object of the present invention is to provide a wind turbine system with the LVRT performance by using a mechanism that requires reduced maintenance.

In an aspect of the present invention, a wind turbine system is provided with: a wind turbine rotor including a blade having a variable pitch angle; a pitch control mechanism driving the blade to control the pitch angle; and an emergency power supply mechanism generating electric power from rotation of the wind turbine rotor and feeding the electric power to the pitch control mechanism, in response to occurrence of an accidental drop of a system voltage of a power grid.

The wind turbine system thus structured provides the LVRT performance by using the emergency power supply mechanism, eliminating the necessity of batteries. This effectively reduces the necessity of maintenance of the wind turbine system. Additionally, the emergency power supply mechanism is highly reliable and almost free from influences of the external environment.

In a preferred embodiment, the emergency power supply mechanism includes: a generator mechanism drive by the wind turbine rotor, and an emergency switch providing an electrical connection between the generator mechanism and the pitch control mechanism, when occurrence of an accidental drop of the system voltage is detected. In this case, the emergency switch preferably disconnects the generator mechanism from the pitch control mechanism to place an output terminal of the generator mechanism into an open state, when the system voltage is normal.

The wind turbine system may further include a shaft mechanically connected with the wind turbine rotor; and a rotating body connected with the shaft. In this case, the emergency power supply mechanism may include an emergency generator and a power transmission mechanism transmitting rotation of the rotating body to a rotor of the emergency generator, and the emergency generator is driven by the rotation transmitted by the power transmission mechanism to generate the electric power. The power transmission mechanism may include a gear drive, a belt drive, a chain drive, a friction drive or other transmission mechanisms.

In a preferred embodiment, the rotating body is a brake disc.

The emergency power supply mechanism may include an emergency generator which is mechanically connected with the wind turbine rotor, and designed to be operatable as a motor; and a switch for providing a connection between the power grid and the emergency generator.

The wind turbine system may further include a controller generating a pitch command indicating the pitch angle of the blade, and the pitch control mechanism may control the pitch angle in response to the pitch command. In this case, the emergency power supply mechanism preferably feeds the electric power generated from rotation of the wind turbine rotor to the controller, in response to occurrence of an accidental drop of the system voltage of the power grid.

The wind turbine system may further include an induction generator such as a wound-rotor induction generator or a synchronous generator. When the wind turbine system includes a wound-rotor induction generator driven by the wind turbine rotor, the wind turbine system may further include a protection circuit connected with a rotor winding of the wound-rotor induction generator and adapted to consume power received from the rotor winding in response to a control signal. In this case, the emergency power supply mechanism preferably feeds the electric power generated from rotation of the wind turbine rotor to the protection circuit, in response to occurrence of an accidental drop of the system voltage of the power grid.

Instead, the wind turbine system may further include

The wind turbine system may further include a shaft mechanically connected with the wind turbine rotor. In this case, the emergency power supply mechanism preferably includes a rotating body connected with the shaft and generates the electric power by electromagnetic induction caused by rotation of the rotating body.

It is preferable that the emergency power supply mechanism further includes a coil positioned near the rotating body and the rotating body comprises a permanent magnet. In this case, the emergency power supply mechanism generates the electric power by using the coil and feeds the electric power to the pitch control mechanism, when occurrence of an accidental drop of the system voltage is detected.

It is also preferable that the emergency power supply mechanism further includes a coil positioned near the rotating body and a permanent magnet inserted into the coil, and the rotating body may be provided with holes. In this case, the emergency power supply mechanism generates the electric power by using the coil and feeds the electric power to the pitch control mechanism, when occurrence of an accidental drop of the system voltage is detected.

It is also preferable that the emergency power supply mechanism further includes a permanent magnet positioned near the rotating body, a first brush biased toward a side of the rotating body and a second brush biased toward the shaft. In this case, the emergency power supply mechanism obtains electric power from the first and second brushes and feeds the obtained electric power to the pitch control mechanism, when occurrence of an accidental drop of the system voltage is detected.

In another aspect of the present invention, an emergency power supply method is provide for a wind turbine system including a wind turbine rotor provided with a blade having a variable pitch and a pitch control mechanism controlling the pitch angle, the method comprising:

detecting occurrence of an accidental drop of a system voltage of a power grid;

feeding electric power generated from rotation of the wind turbine rotor to the pitch control mechanism in response to the occurrence of the accidental drop.

DESCRIPTION OF PREFERRED EMBODIMENTS

Figure 1A:
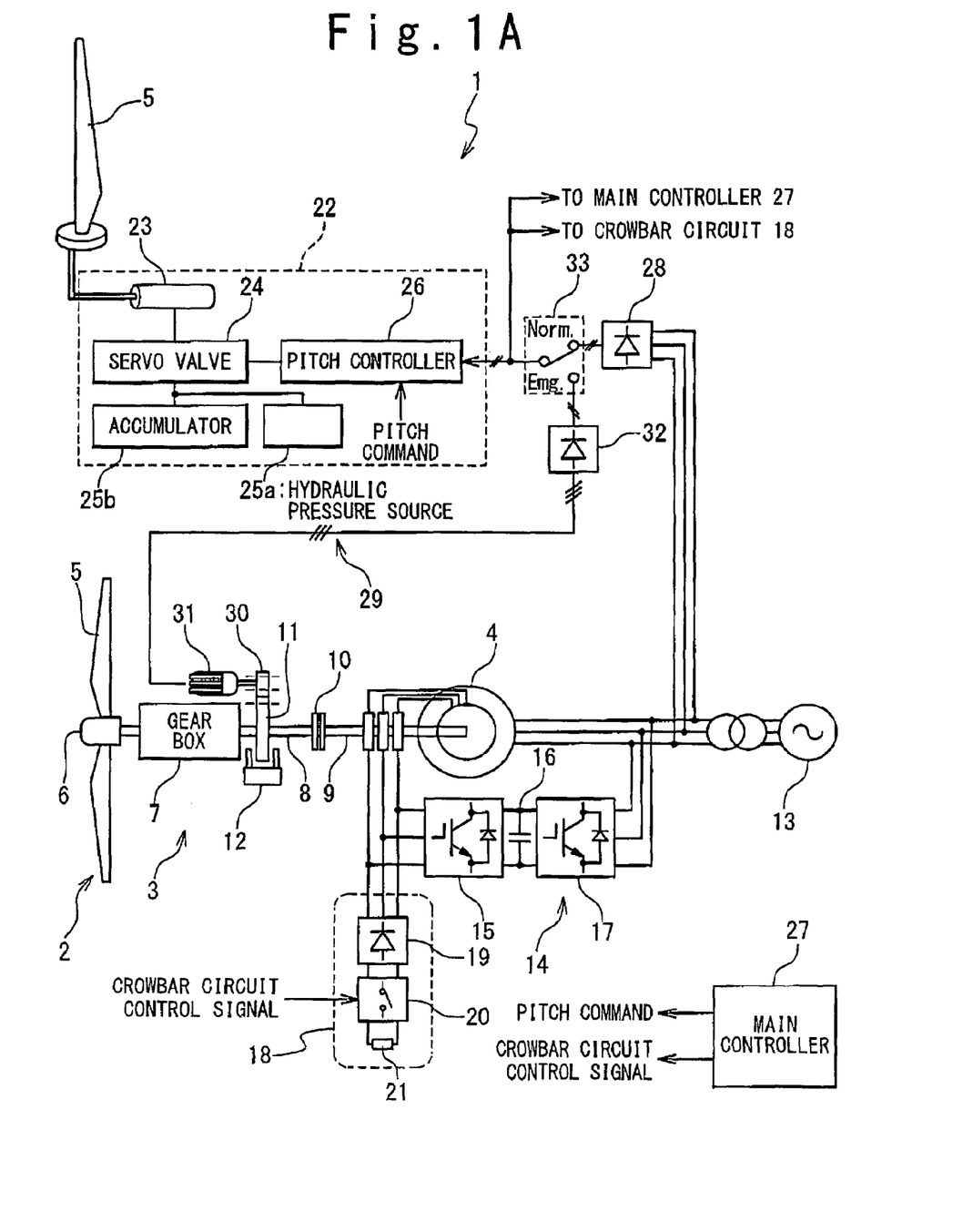
FIG. 1A is a block diagram illustrating the structure of a wind turbine system in one embodiment of the present invention.
Figure 1B:
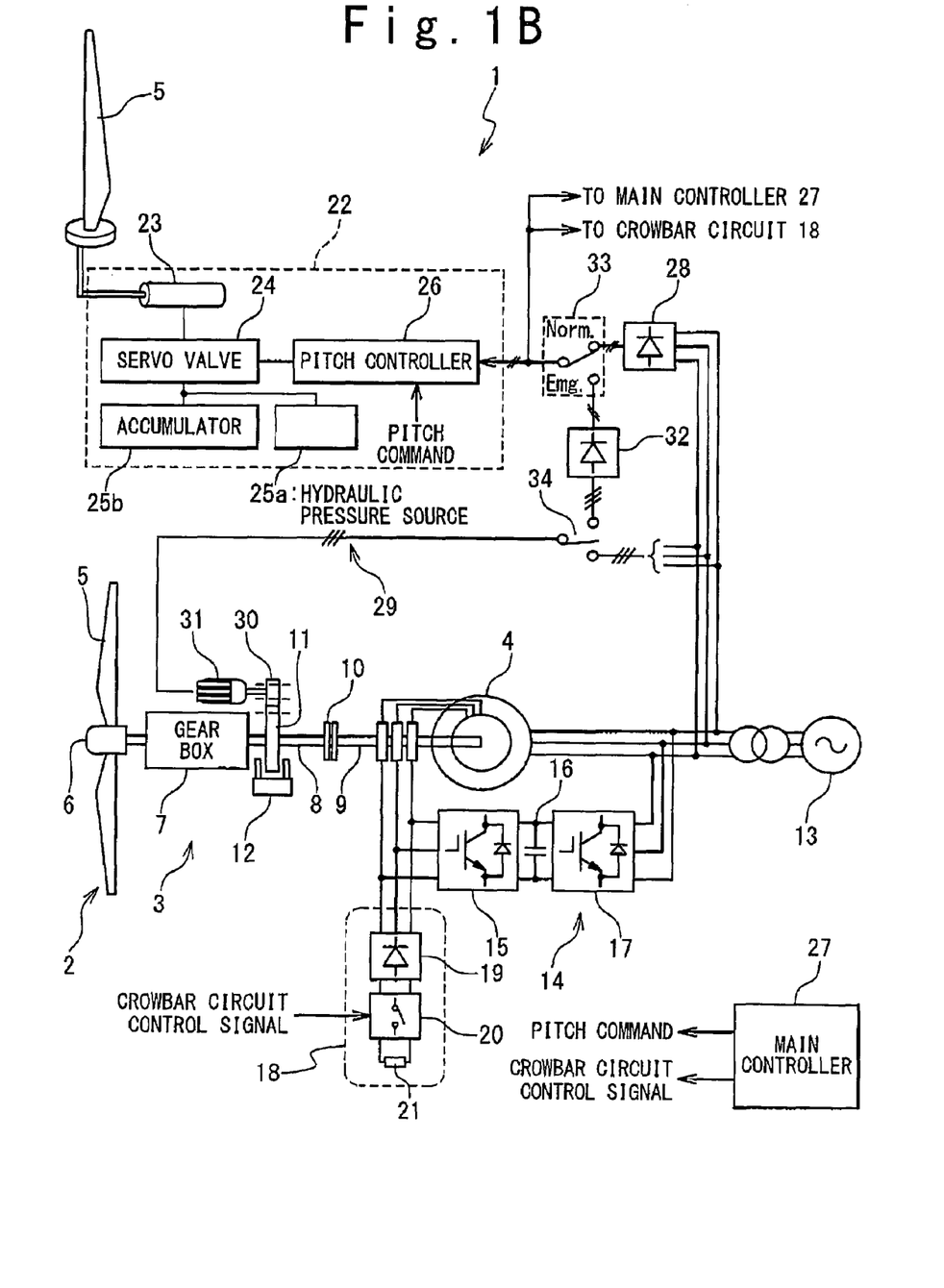
FIG. 1B is a block diagram illustrating the structure of a wind turbine system in another embodiment of the present invention.

FIG. 1 is a block diagram illustrating the structure of a wind turbine system 1 in one embodiment of the present invention. The wind turbine system 1 is provided with a wind turbine rotor 2, a drive train 3, and a wound-rotor induction generator 4. The wind turbine rotor 2 is mechanically coupled with the rotor of the wound-rotor induction generator 4 through the drive train 3. The rotation of the wind turbine rotor 2 is transmitted to the wound-rotor induction generator 4 through the drive train 3 to thereby drive the wound-rotor induction generator 4.

The wind turbine rotor 2 is provided with blades 5 and a hub 6 that supports the blades 5. The blades 5 are supported so that the pitch angle thereof is variable.

The drive train 3 is provided with a gear box 7, a wind turbine shaft B, a generator shaft 9 and a coupling mechanism 10. The hub 6 of the wind turbine rotor 2 is mechanically connected with the wind turbine shaft 8 through the gear box 7, and the wind turbine shaft 8 is mechanically connected with the generator shaft 9 through the coupling mechanism 10. The coupling mechanism 10 provides an elastic connection between the wind turbine shaft 8 and the generator shaft 9, absorbing the variations between the positions of the wind turbine shaft 8 and the generator shaft 9. The generator shaft 9 is rigidly connected with the rotor of the wound-rotor induction generator 4.

Connected with the wind turbine shaft 8 is a brake disc 11 which is a rotating body used to decelerate or stop the wind turbine rotor 2. A brake caliper 12 is provided near the brake disc 11, and the wind turbine rotor 2 is decelerated or stopped by operating the brake caliper 12 to hold the brake disc 11.

The would-rotor induction generator 4 is designed to output electric power from both of the stator and rotor windings. In other words, the stator winding of the would-rotor induction generator 4 is directly connected with a power grid 13, and the rotor winding is connected with the power grid 13 through a power converter 14. The power converter 14 provides frequency conversion for AC power received from the rotor winding to match the frequency of the power grid 13. The power converter 14 is provided with an active rectifier 15, a DC bus 16 and an inverter 17. The active rectifier 15 converts AC power generated on the rotor winding into DC power, and feeds the DC power to the DC bus 16. The inverter 17 converts the DC power received from the DC bus 16 into AC power of the frequency of the power grid 13, and feeds the AC power to the power grid 13.

The rotor winding of the would-rotor generator 4 is further connected with a crowbar circuit 18 which is used to protect the rotor winding from excessive currents. The crowbar circuit 18 is provided with a rectifier 19, a switch 20 and a load resistor 21. The rectifier 19 converts AC power from the rotor winding into DC power. The switch 20 is responsive to an external control signal for providing electrical connections between the rectifier 19 and the load resistor 21. The turn-on of the switch 20 within the crowbar circuit 18 allows the crowbar switch 18 to protect the rotor winding. When the switch 20 is turned on, the AC power generated on the rotor winding is converted into the DC power, which is eventually consumed by the load resistor 21. Such operation effectively reduces the currents through the rotor winding, achieving protection of the rotor winding.

The pitch angle control of the blades 5 of the wind turbine rotor 2 is implemented by a pitch control mechanism 22. It should be noted that although the blades 5 are illustrated as being connected with the pitch control mechanism 22 and the hub 6 separately in FIG. 5, this only aims at easiness of the understanding; the blades 5 shown as being connected with the pitch control mechanism 22 and the hub 6 denote the same elements.

The pitch control mechanism 22 is provided with a hydraulic cylinder 23, a fluid regulating valve 24, a hydraulic pressure source 25a, an accumulator 25b and a pitch controller 26. The hydraulic cylinder 23 operates on the working fluid fed from the hydraulic pressure source 25a to drive the blades 5. The hydraulic pressure source 25a operates on electric power fed from the power grid 13 to exert pressure on the working fluid. In one embodiment, an oil pump is preferably used as the hydraulic pressure source 25a. Instead of, or in addition to the oil pump, an oil tank may be used as the hydraulic pressure source 25a. The accumulator 25b accumulates the working fluid to retain pressure of the working fluid. The accumulator 25b has a role of exerting necessary pressure on the working fluid when the supply of electric power to the hydraulic pressure source 25a is stopped. The fluid regulating valve 24 controls the flow rate of the working fluid fed from the hydraulic pressure source 25a and the accumulator 25b to the hydraulic cylinder 23. The pitch controller 26 feeds a DC drive current to the fluid regulating valve 24. The valve travel of the fluid regulating valve 24 is controlled on the DC drive current. The flow rate of the working fluid to the hydraulic cylinder 23 is controlled by the valve travel of the fluid regulating valve 24 to thereby control the pitch angle of the blades 5 to a desired value. In one embodiment, the whole of the pitch control mechanism 22 may be accommodated in the hub 6. Instead, at least one but not all of the components of the pitch control mechanism 22 (such as, the hydraulic cylinder 23, the accumulator 25b, and the fluid regulating valve 24) may be accommodated in the hub 6.

Overall control of the wind turbine system 1 is achieved by a main controller 27. First, the main controller 27 generates a pitch command indicating the pitch angle of the blades 5, and sends the pitch command to the pitch controller 26. Second, the main controller 27 feeds a crowbar circuit control signal to the crowbar circuit 18. When the crowbar circuit control signal is activated, the switch 20 within the crowbar circuit 18 is turned on to allow consuming AC power generated on the rotor winding by using the load resistor 21. The main controller 27 further provides various controls, including the control of the power converter 14.

During normal operation, electric power used to operate the pitch control mechanism 22, the crowbar circuit 18 and the main controller 27 is fed from the power grid 13. More specifically, a rectifier 28 is connected with power lines between the would-rotor induction generator 4 and the power grid 13. The rectifier 28 generates DC power for operating the pitch control mechanism 22, the crowbar circuit 18 and the main controller 27.

An emergency power supply system 29 is provided for the wind turbine system 1, which feeds electric power necessary for operating the pitch control mechanism 22, the crowbar circuit 18 and the main controller 27, when an accidental drop of the system voltage is detected with respect to the power grid 13. The emergency power supply system 29 is provided with a power transmission mechanism 30, an emergency generator 31, a rectifier 32 and an emergency switch 33.

The power transmission mechanism 30 transmits rotation of the wind turbine rotor 2 to the emergency generator 31. In one embodiment, the power transmission mechanism 30 transmits rotation of the brake disc 11 to drive the rotor of the emergency generator 31. In one embodiment, a gear wheel may be used as the brake disc 11, and the power transmission mechanism 30 may be provided with a gear mechanically connected with the rotor of the emergency generator 31. Instead, the power transmission mechanism 30 may be provided with a belt that transmits the rotation of the brake disc 11 to the emergency generator 31. In an alternative embodiment, the power transmission mechanism 30 may be connected with other mechanical elements rotating with the wind turbine shaft 8 in place of the brake disc 11. It should be noted, however, that the structure in which the power transmission mechanism 30 is mechanically connected with the brake disc 11 is preferable in terms of the reduction of the number of the components in the wind turbine system 1.

The emergency generator 31 and the rectifier 32 function as a generator mechanism that generates electric power from the rotation of the wind turbine rotor 2. In detail, the emergency generator 31 generates AC power from the rotation of the wind turbine rotor 2. The rectifier 32 converts the AC power received from the emergency generator 31 into DC power.

The emergency switch 33 electrically connects selected one of the rectifiers 28 and 32 with the pitch control mechanism 22, the crowbar circuit 18, and the main controller 27. It should be noted that the rectifier 28 is connected with the power grid 13, while the rectifier 32 is provided within the emergency power supply system 29.

During normal operation (that is, when the system voltage is normal), the emergency switch 33 connects the pitch control mechanism 22, the crowbar circuit 18 and the main controller 27 with the rectifier 28, which is connected with the power grid 13. This allows feeding electric power from the power grid 13 to the pitch control mechanism 22, the crowbar circuit 18 and the main controller 27. In this embodiment, the emergency generator 31 is preferably set free from load; in other words, the output terminals of the rectifier 32, which is connected with the emergency generator 31, are preferably placed into the open state by the emergency switch 33, during the normal operation. This effectively reduces the influence on the drive train 3, such as the torque ripple caused by the unevenness of the magnetic flux distribution across the emergency generator 31.

When an accidental drop of the system voltage occurs, on the other hand, the emergency switch 33 connects the pitch control mechanism 22, the crowbar circuit 18 and the main controller 27 to the rectifier 32 within the emergency power supply system 29. The emergency power supply system 29 feeds electric power to the pitch control mechanism 22, the crowbar circuit 18 and the main controller 27, and thereby maintains the operations of the pitch control mechanism 22, the crowbar circuit 18 and the main controller 27. This eliminates the necessity of disconnecting the wind turbine system 1 from the power grid 13, providing the wind turbine system 1 with the LVRT performance. Additionally, maintaining the operations of the pitch control mechanism 22 and the main controller 27 allows controlling the pitch angle of the blades 5, and thereby avoiding an excessive increase in the revolution speed of the wind turbine rotor 2. Furthermore, maintaining the operation of the crowbar circuit 18 provides protection of the rotor winding. When an accidental drop of the system voltage occurs, an excessive current may flow through the rotor winding of the would-rotor induction generator 4. In this embodiment, however, the switch 20 within the crowbar circuit 18 is turned on by using the electric power fed from the emergency power supply system 29 to rapidly reduce the current through the rotor winding by the load resistor 21. Such operation allows effective protection of the rotor winding.

One advantage of the above-described structure of the emergency power supply system 29 is reduction in the labor necessary for the maintenance thereof. In contrast to an UPS, the emergency power supply system 29, which incorporates the emergency generator 31, requires no battery. Exclusion of batteries is effective for reducing the labor for maintenance.

Another advantage is that the emergency power supply system 29 itself has a function of reducing the revolution speed of the wind turbine rotor 2. As discussed above, an accidental drop of the system voltage reduces the load of the wound-rotor induction generator 4, potentially resulting in an excessive increase in the revolution speed of the wind turbine rotor 2. In the wind turbine system 1 in this embodiment, however, the emergency generator 31 starts to be driven by the rotation of the wind turbine rotor 2, and to feed electric power to the pitch control mechanism 22, the crowbar circuit 18 and the main controller 27, when the system voltage drop occurs. This reduces the rotational energy of the wind turbine rotor 2 and thereby limits the rotation speed of the wind turbine rotor 2, effectively avoiding an excessive increase in the rotation speed.

When the emergency generator 31 is designed to be operatable as a motor, the emergency generator 31 may be also used as a rotor turning motor which allows manually rotating the wind turbine rotor 2 in the maintenance of the wind turbine system 1. In this case, as shown in FIG. 1A, the stator winding of the emergency generator 31 is connected with a switch 34 that selectively connects the stator winding of the emergency generator 31 with selected one of the rectifier 32 and the power grid 13. When the emergency generator 31 is used as the rotor turning motor, the stator winding of the emergency generator 31 is electrically connected with the power grid 13. In this case, the emergency generator 31 operates on electric power fed from the power grid 13, and drives the wind turbine shaft 8 to rotate the wind turbine rotor 2.

Figure 2:
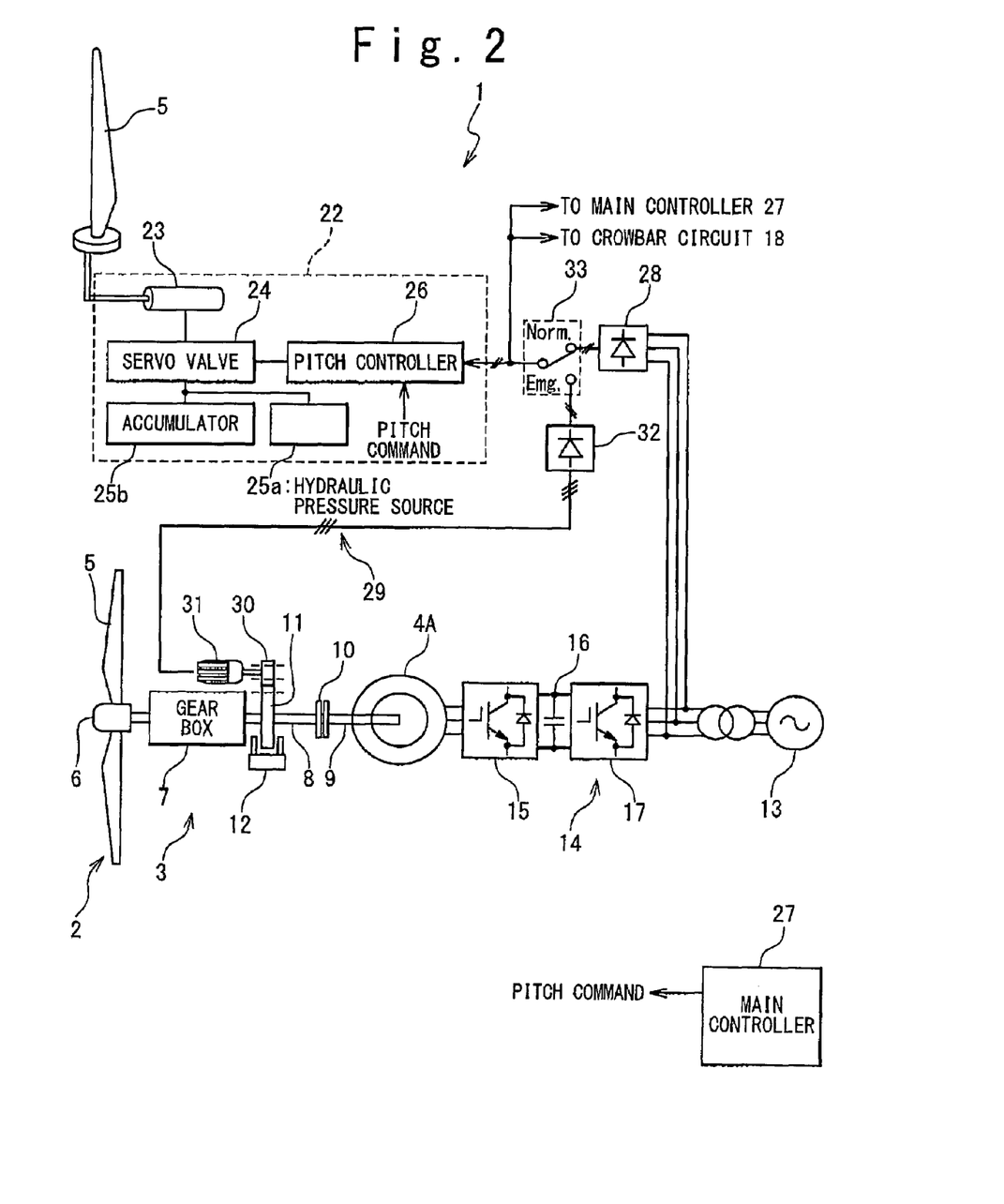
FIG. 2 is a block diagram illustrating the structure of a wind turbine system in still another embodiment of the present invention.

In an alternative embodiment, as shown in FIG. 2, a synchronous generator 4A may be used in place of the wounded-rotor induction generator 4. In this case, the stator winding of the synchronous generator 4A is connected with the power converter 14. The power converter 14 provides frequency conversion for AC power received from the stator winding of the synchronous generator 4A to match the frequency of the power grid 13. In detail, the active rectifier 15 converts AC power generated on the stator winding of the synchronous generator 4A into DC power, and feeds the DC power to the DC bus 16. The inverter 17 converts the DC power received from the DC bus 16 into AC power of the frequency of the power grid 13, and feeds the AC power to the power grid 13. When the synchronous generator 4A is used, the crowbar circuit 18 is removed from the wind turbine system 1.

In another alternative embodiment, the brake disc itself may be used as a component of a generator, instead of providing a mechanical connection between the brake disc 11 and the emergency generator 31 with the power transmission mechanism 31. In this case, the rotation of the brake disc causes electromagnetic induction, and electric power generated by the electromagnetic induction is fed to the pitch control mechanism 22, the crowbar circuit 18 and the main controller 27.

Figure 3:
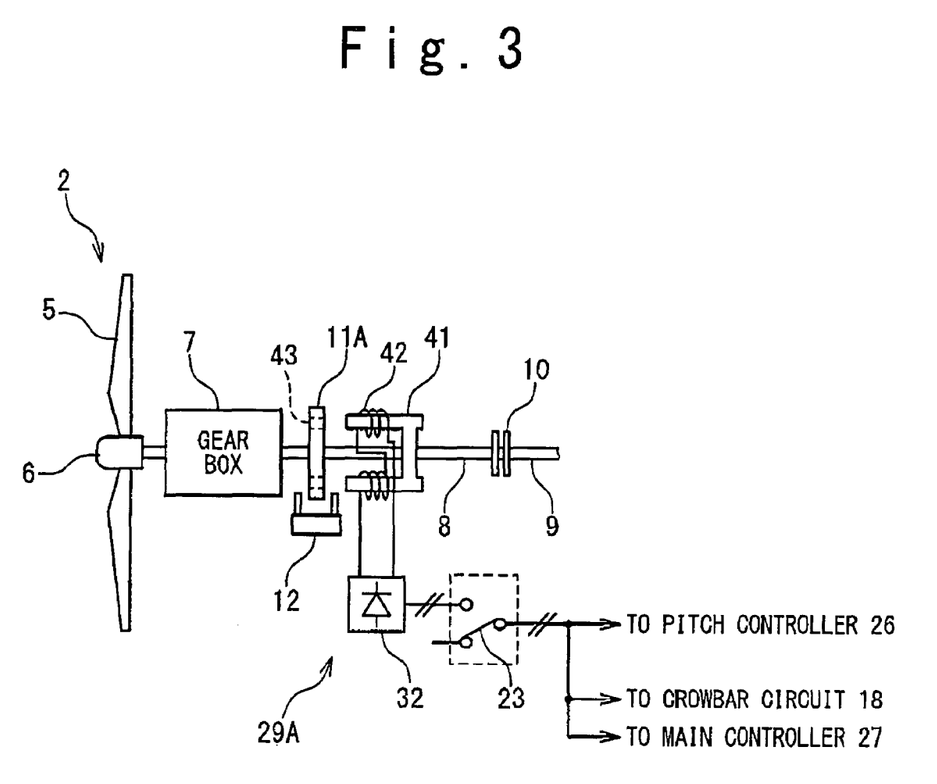
FIG. 3 is a block diagram illustrating the structure of a wind turbine system in still another embodiment of the present invention.

In one embodiment, as shown in FIG. 3, an emergency power supply system 29A is provided with a brake disc 11A, an iron core 41, and a coil 42 into which the iron core 41 is inserted. The brake disc 11A rotates with the wind turbine shaft 8. The coil 42 is electrically connected with the rectifier 32 and positioned near the brake disc 11A. Permanent magnets 43 are embedded within the brake disc 11A. The iron core 41 concentrates the flux generated by the permanent magnets 43 into the coil 42.

In this structure, the wind turbine shaft 8 and the brake disc 11A function as a rotor of a generator, and the iron core 41 and the coil 42 function as a stator of the generator. This achieves power generation. The rotation of the brake disc 11A causes a change in the flux through the coil 42, generating AC power on the coil 42. The AC power is converted into DC power by the rectifier 32. When an accidental drop of the system voltage occurs, the DC power generated by the rectifier 32 is fed to the pitch control mechanism 22, the crowbar circuit 18 and the main controller 27 through the emergency switch 33.

One advantage is that the structure shown in FIG. 3 allows excluding the power transmission mechanism 30, which provides a mechanical connection between the generator mechanism (e.g. the emergency generator 31) and the wind turbine shaft 8. The power transmission mechanism 30 more or less suffers from loss, because the power transmission mechanism 30 is driven by the rotation of the wind turbine rotor 2. Excluding the power transmission mechanism 30 is effective for reducing the loss of the wind turbine system 1.

Alternatively, the permanent magnets 43 may be embedded within a circular disc which is provided separately from the brake disc 11A so as to rotate with the wind turbine shaft 8. In this case, the coil 42 is positioned near the circular disc.

Figure 4:
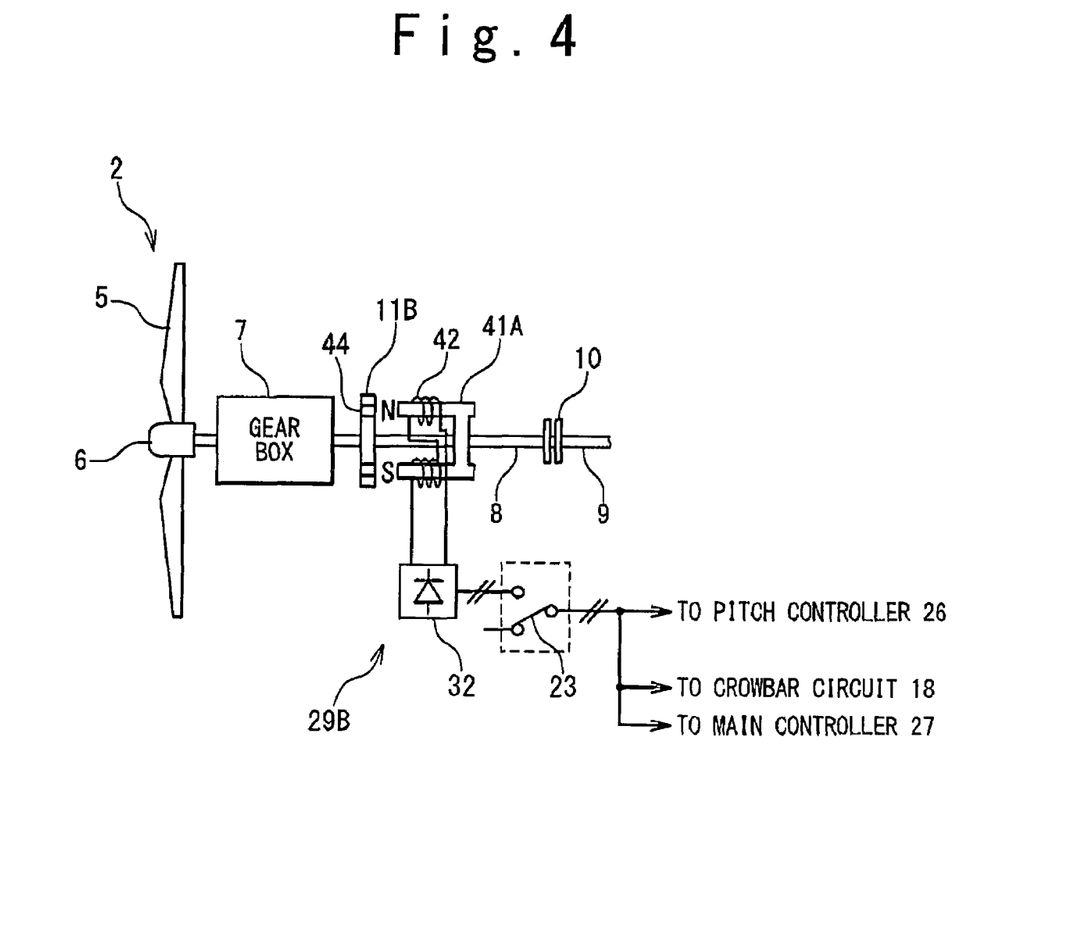
FIG. 4 is a block diagram illustrating the structure of a wind turbine system in still another embodiment of the present invention.

In another embodiment, as shown in FIG. 4, an emergency power supply system 29B may be provided with a brake disc 11B, a permanent magnet 41A, and a coil 42 into which the permanent magnet 41A is inserted. The brake disc 11B rotates with the wind turbine shaft 8. The coil 42 is electrically connected with the rectifier 32 and positioned opposed to the brake disc 11B. The brake disc 11B is provided with a set of holes 44 penetrating the brake disc 11B in the thickness direction thereof. The holes 44 are positioned so as to pass in front of the coil 42.

In the above-described structure, the wind turbine shaft 8 and the brake disc 11B function as a rotor of a generator, and the permanent magnet 41A and the coil 42 function as a stator of the generator. This achieves power generation. The rotation of the brake disc 11B causes a change in the flux through the coil 42, generating AC power on the coil 42. The AC power is converted into DC power by the rectifier 32. When a system voltage drop accidentally occurs, the DC power generated by the rectifier 32 is fed to the pitch control mechanism 22, the crowbar circuit 18 and the main controller 27 through the emergency switch 33. The structure shown in FIG. 4 also allows excluding the power transmission mechanism 30, and thereby reducing the loss of the wind turbine system 1.

Alternatively, a circular disc with the holes 44 is provided separately from the brake disc 11B so as to rotate with the wind turbine shaft 8. In this case, the coil 42 is positioned near the circular disc.

Figure 5:
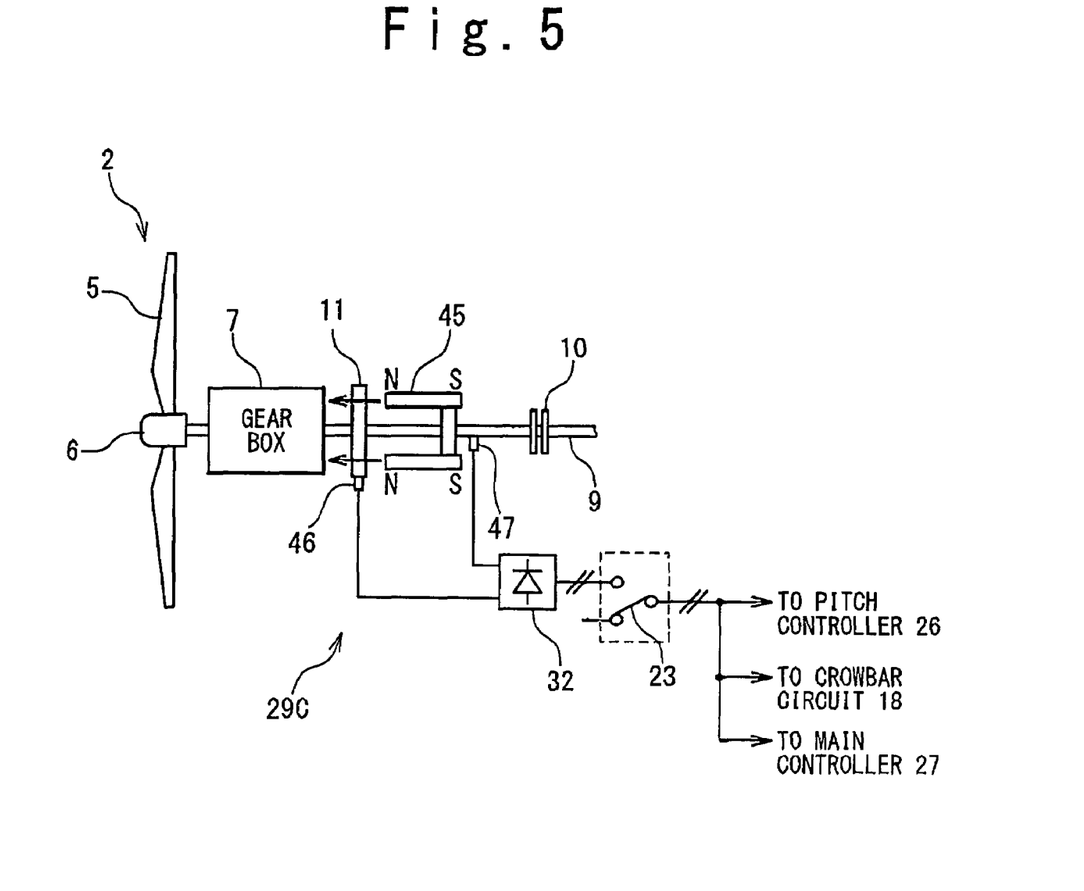
FIG. 5 is a block diagram illustrating the structure of a wind turbine system in still another embodiment of the present invention.

In still another embodiment, as shown in FIG. 5, an emergency power supply system 29C may be provided with a brake disc 11C, a permanent magnet 45, and brushes 46 and 47. The brake disc 11C is connected with the wind turbine shaft 8 at the center thereof, so as to rotate with the wind turbine shaft 8. The permanent magnet 45 is positioned opposed to the brake disc 11C. The permanent magnet 45 applies magnetic flux to the brake disc 11C so that the flux distribution is uniform with respect to the circumferential direction. The side of the brake disc 11C is smoothly surfaced and the brush 46 is mechanically biased toward the side of the brake disc 11C. Additionally, the brush 47 is mechanically biased toward the side of the wind turbine shaft 8. The brushes 46 and 47 are connected with a DC-DC converter 32A, and the output terminal of the DC-DC converter 32A is connected with the emergency switch 33.

Such structure allows generating electric power by the unipolar induction. The rotation of the brake disc 11C causes the unipolar induction, inducing a DC voltage between the side and the center of the brake disc 11C. The DC voltage is collected by the brushes 46 and 47 and fed to the DC-DC converter 32A. The DC-DC converter 32A converts the DC voltage received from the brushes 46 and 47 into a DC voltage of a desired voltage level. When an accidental drop of the system voltage occurs, the DC power generated by the DC-DC converter 32A is fed to the pitch control mechanism 22, the crowbar circuit 18 and the main controller 27 through the emergency switch 33. The structure shown in FIG. 5 also allows excluding the power transmission mechanism 30, and thereby reducing the loss of the wind turbine system 1.

Alternatively, a metal circular disc may be provided separately from the brake disc 11C so as to rotate with the wind turbine shaft B. In this case, the metal circular disc is positioned near the permanent magnet 45.

It is apparent that the present invention is not limited to the above-described embodiments, which may be modified and changed without departing from the scope of the invention.

What is claimed is:

1. A wind turbine system comprising:
   a wind turbine rotor including a blade having a variable pitch angle;
   a shaft mechanically connected with said wind turbine rotor;
   a brake disc connected with said shaft;
   a pitch control mechanism driving said blade to control said pitch angle; and
   an emergency power supply mechanism generating electric power from rotation of said wind turbine rotor and feeding said electric power to said pitch control mechanism, in response to occurrence of an accidental drop of a system voltage of a power grid,
   wherein said emergency power supply mechanism includes:
   an emergency generator; and
   a belt transmitting rotation of said brake disc to a rotor of said emergency generator; and
   wherein said emergency generator is driven by said rotation transmitted by said belt to generate said electric power.

2. The wind turbine system according to claim 1, further comprising a controller generating a pitch command indicating said pitch angle of said blade,
   wherein said pitch control mechanism controls said pitch angle in response to said pitch command, and
   wherein said emergency power supply mechanism feeds said electric power generated from rotation of said wind turbine rotor to said controller, in response to occurrence of an accidental drop of said system voltage of said power grid.

3. A wind turbine system, comprising:
   a wind turbine rotor including a blade having a variable pitch angle;
   a pitch control mechanism driving said blade to control said pitch angle; and
   an emergency power supply mechanism generating electric power from rotation of said wind turbine rotor and feeding said electric power to said pitch control mechanism, in response to occurrence of an accidental drop of a system voltage of a power grid,
   wherein said emergency power supply mechanism includes:
   an emergency generator which is mechanically connected with said wind turbine rotor, and designed to be operatable as a motor; and
   a switch for providing a connection between said power grid and said emergency generator.

4. A wind turbine system comprising:
   a wind turbine rotor including a blade having a variable pitch angle;
   a pitch control mechanism driving said blade to control said pitch angle; and
   an emergency power supply mechanism generating electric power from rotation of said wind turbine rotor and feeding said electric power to said pitch control mechanism, in response to occurrence of an accidental drop of system voltage of a power grid;
   wherein the wind turbine system further comprises:
   a wound-rotor induction generator driven by said wind turbine rotor; and
   a protection circuit connected with a rotor winding of said wound-rotor induction generator and adapted to consume power received from said stator winding in response to a control signal;
   wherein said emergency power supply mechanism feeds said electric power generated from rotation of said wind turbine rotor to said protection circuit, in response to occurrence of an accidental drop of said system voltage of said power grid.

5. The wind turbine system according to claim 4, further comprising:
   a shaft mechanically connected with said wind turbine rotor; and
   a rotating body connected with said shaft;
   wherein said emergency power supply mechanism includes:
   an emergency generator; and
   a power transmission mechanism transmitting rotation of said rotating body to a rotor of said emergency generator, and
   wherein said emergency generator is driven by said rotation transmitted by said power transmission mechanism to generate said electric power.

6. The wind turbine system according to claim 5, wherein said rotating body is a brake disc.

7. The wind turbine system according to claim 6,
   wherein said power transmission mechanism includes a belt transmitting rotation of said brake disc to said rotor of said emergency generator, and
   wherein said emergency generator is driven by said rotation transmitted by said belt to generate said electric power.

8. A wind turbine system, comprising:
   a wind turbine rotor including a blade having a variable pitch angle;
   a pitch control mechanism driving said blade to control said pitch angle;
   an emergency power supply mechanism generating electric power from rotation of said wind turbine rotor and feeding said electric power to said pitch control mechanism, in response to occurrence of an accidental drop of a system voltage of a power grid; and
   a shaft mechanically connected with said wind turbine rotor;
   wherein said emergency power supply mechanism includes a rotating body connected with said shaft and generates electric power by electromagnetic induction caused by rotation of said rotating body;

wherein said emergency power supply mechanism further includes a coil positioned near said rotating body, wherein said rotating body comprises a permanent magnet; and wherein said emergency power supply mechanism generates said electric power by using said coil and feeds said electric power to said pitch control mechanism, when occurrence of an accidental drop of said system voltage is detected.

9. A wind turbine system, comprising:

a wind turbine rotor including a blade having a variable pitch angle;

a pitch control mechanism driving said blade to control said pitch angle;

an emergency power supply mechanism generating electric power from rotation of said wind turbine rotor and feeding said electric power to said pitch control mechanism, in response to occurrence of an accidental drop of a system voltage of a power grid; and a shaft mechanically connected with said wind turbine rotor;

wherein said emergency power supply mechanism includes a rotating body connected with said shaft and generates said electric power by electromagnetic induction caused by rotation of said rotating body;

wherein said emergency power supply mechanism further includes:

a coil positioned near said rotating body; and a permanent magnet inserted into said coil, wherein said rotating body is provided with holes, and wherein said emergency power supply mechanism generates said electric power by using said coil and feeds said electric power to said pitch control mechanism, when occurrence of an accidental drop of said system voltage is detected.

10. A wind turbine system, comprising:

a wind turbine rotor including a blade having a variable pitch angle;

a pitch control mechanism driving said blade to control said pitch angle;

an emergency power supply mechanism generating electric power from rotation of said wind turbine rotor and feeding said electric power to said pitch control mechanism, in response to occurrence of an accidental drop of a system voltage of a power grid; and a shaft mechanically connected with said wind turbine rotor;

wherein said emergency power supply mechanism includes a rotating body connected with said shaft and generates said electric power by electromagnetic induction caused by rotation of said rotating body;

wherein said emergency power supply mechanism further includes:

a permanent magnet positioned near said rotating body;

a first brush biased toward a side of said rotating body; and a second brush biased toward said shaft, and wherein said emergency power supply mechanism obtains electric power from said first and second brushes and feeds said obtained electric power to said pitch control mechanism, when occurrence of an accidental drop of said system voltage is detected.

* * * * *